Jan. 31, 1967  B. M. JAREMUS  3,300,990
THERMOELECTRIC MEAT AGING/TENDERIZING APPARATUS
Filed Oct. 14, 1965

INVENTOR
BOUBENE M. JAREMUS
BY Thomas B. Hunter
ATTORNEY

United States Patent Office 3,300,990
Patented Jan. 31, 1967

1

3,300,990
THERMOELECTRIC MEAT AGING/
TENDERIZING APPARATUS
Boubene M. Jaremus, Barrington, Ill., assignor to Borg-Warner Corporation, Chicago, Ill., a corporation of Illinois
Filed Oct. 14, 1965, Ser. No. 495,915
9 Claims. (Cl. 62—3)

This invention relates to an improved meat storage apparatus, and more specifically to an insulated cabinet adapted to tenderize and/or age meat which is provided with a thermoelectric conditioning unit.

Various meat aging and tenderizing processes are known in the prior art, but almost without exception such known processes are only suitable for large scale, commercial operations such as by meat packers and restaurants. Recently, however, certain processes have been developed which drastically reduce the aging time required to impart an aged, walnut like flavor to meat and thereby clear the way for domestic aging of individual cuts of meat, i.e. steaks and chops, etc. An example of such a process is described in United States Patent 2,926,089, issued to Beverly E. Williams on February 23, 1960.

In brief, the Williams' patent describes a rapid meat aging process employing an aging accelerator consisting of a class of molds known as Phycomysetes, and more particularly to a sub-genus of such molds known as Thamnidium. According to the patentee, this process is effective to complete the aging and ripening of meat, and also improve its tenderness, in a period of approximately 48 hours. This is in contrast to known processes now taking up to 21 days to achieve the same results.

As pointed out above, the present invention is more particularly directed to a domestic sized refrigeration cabinet which can be employed to practice a process similar to that described in the aforementioned Williams' patent and can be adapted for other processes as desired. Moreover, the unit serves a dual function in that, when the meat aging process is completed, that unit automatically cools down the processed meat to a storage temperature (approximately 34° F.), and therefore can be employed as a conventional refrigerator. The unit is furnished with a thermoelectric conditioning unit which is especially adapted to maintain precise temperature conditions by virtue of the fact that the conditioning unit can be made to heat or cool simply by reversing the direction of the unidirectional electrical energy supply thereto. Moreover, since a thermoelectric unit is capable of effecting cross-ambient temperature control, i.e. maintaining temperatures both above and below ambient, it is easily adaptable to controlling the temperature at different levels which may be required to carry out the process and then maintain the processed meat under refrigeration for extended periods of time after the process is completed.

It is, therefore, a principal object of the present invention to provide an improved meat tenderizing and aging compartment which is adapted to maintain the proper temperature during various stages of a meat aging/tenderizing process.

It is a further object of the present invention to provide such a combined meat tenderizing and aging compartment equipped with a programmed unit which automatically actuates the various components such as ultra-violet lights for sterilizing the meat, the humidity control, etc. and then reduces the temperature for storage of the processsd meat.

Additional objects and advantages of the present invention will be obvious from reading the following detailed description with reference to the accompanying drawings wherein:

2

Figures 1, 2, 3:
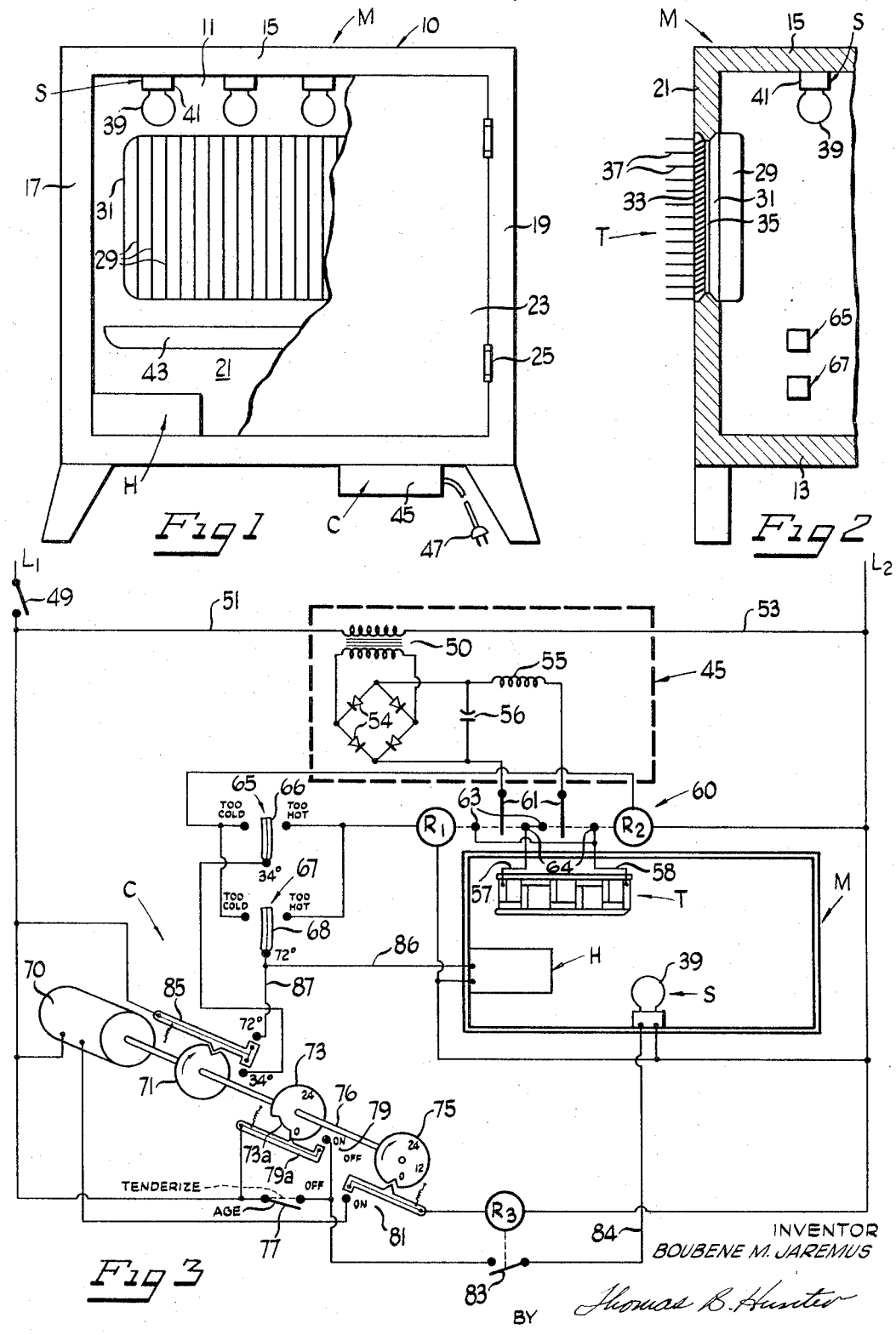
FIGURE 1 is an elevational view of a meat aging-tenderizing-storage compartment, partly broken away for clarity, illustrating a preferred embodiment of the present invention.
FIGURE 2 is a fragmentary side view, partly in cross-section, of the apparatus shown in FIGURE 1.
FIGURE 3 is a schematic diagram illustrating the circuit which controls the apparatus of FIGURES 1 and 2.

In general, the drawings show a meat storage and processing apparatus M including a thermoelectric conditioning unit T, a humidification unit H, a sterilizing unit S, and a programmed control unit C to actuate the various components employed in the meat aging/tenderizing process.

More particularly, and with reference to FIGURES 1 and 2, meat storage apparatus M includes insulated, vapor-tight cabinet 10 providing a storage area 11, said cabinet including bottom and top walls 13, 15, side walls 17, 19, back wall 21, and an insulated sealing door 23, pivotable on hinges 25 to allow access to internal storage area 11. Associated with the back wall 21 is the thermoelectric conditioning unit T which includes an attempering plate 29 fixed in thermally conductive relation to the load side heat conducting element 31. The latter forms one side of a thermoelectric module 35 which conventionally comprises a plurality of P and N type thermoelectric elements connected in series circuit to provide hot and cold junctions on opposite sides thereof. A typical construction of this type is shown in United States Patent 3,178,896. On the opposite side of the module is a sink-side heat conducting element 33 to which are attached a plurality of heat conducting fins 37 which promote the heat transfer with a sink-side heat exchange fluid, such as air directed over said fins.

In addition to the thermoelectric conditioning unit T, the cabinet 10 houses a humidification unit H of any conventional design including a humidistat and means for adding moisture or water vapor to the air, and a sterilizing unit S including a source of ultraviolet radiation in the form of UV lamps 39 received in sockets 41. Other means for sterilizing the atmosphere may be employed including those mentioned in the Williams' patent. A drip tray 43 may also be included together with such additional (optional) features as fans and an odor filtering device (not shown).

The control unit C, which may be conveniently secured to the bottom wall 13 of the cabinet, includes a power supply 45 having a plug 47 for connecting to an A.C. outlet, and a switch system which controls the temperature level and the operation of the various units within the cabinet by means of the circuit shown in FIGURE 3.

In FIGURE 3, the circuit referred to above is illustrated in the mode corresponding to normal or cold storage operation. A.C. power is supplied through main lines $L_1$, $L_2$, one of which is provided with a main power switch 49. The power supply 45 (shown schematically as enclosed within the dotted lines in FIGURE 3) includes a transformer 50 connected by means of conductors 51 and 53 to the main power supply $L_1$, $L_2$. The output from transformer 50 is connected to an A.C. to D.C. converter or rectifier which includes a bridge circuit having diodes 54, a choke 55, and a capacitor 56. The unidirectional current from the converter is supplied through a temperature responsive switch, generally designated at 60 and conductors 57, 58 to the thermoelectric conditioning unit T.

The switch mechanism 60 is of the reversing type and is adapted to selectively direct the unidirectional electrical energy through the thermoelectric conditioning unit in either direction so as to effect a change in the direction that heat is pumped between the storage zone and the heat sink. This permits the selective operation of said unit as a heating or cooling means to maintain the desired temperature within precise limits. The switch mechanism 60 is also adapted to be responsive to either one of two thermostats by the selective energization of relay $R_1$ or relay $R_2$ in a manner which will be described in more detail below.

Output conductors 57, 58 from the converter are coupled to movable switch arms 61 of three-position switch 60. The switch is shown in its non-conducting position with the movable arms stationed between two pairs of contacts 63 and 64. The switch is adapted to be placed under the control of either a low temperature thermostat 65 or a high temperature thermostat 67, depending on the desired temperature level; and the actuation of the switch arm is effected by selective energization of two relays $R_1$ and $R_2$. Considering first the operation of the low temperature thermostat 65, a bimetallic element 66 is adapted to complete a circuit through, and thereby selectively energize $R_1$ or $R_2$, should the temperature vary beyond a predetermined range. If the temperature rises above 34° F. by a fixed amount, thermostat 65 will activate relay $R_1$, pulling arms 61 to contacts 63; and relay $R_2$ will be energized to effect a shift of the arms to contacts 64 if the temperature falls below 34° F. by a fixed amount. When contacts 63 are engaged, the thermoelectric cooling unit will operate as a refrigeration unit; and when contacts 64 are engaged, the thermoelectric cooling unit will operate as a heater. When neither relay is energized, the switch arms will return to a neutral position and no current will be conducted to the thermoelectric conditioning unit T.

In accordance with the present invention, the cabinet can be operated as a conventional refrigerator or as a meat processing apparatus which provides the necessary environment to carry out various known meat aging and/or tenderizing processes. For purposes of explanation, the control cycles for two different processes will be described—one a variation of the Williams' Thamnidium aging process and the other a conventional meat tenderizing process employing ultraviolet radiation.

*Aging cycle*

The processing cycles are under the control of a timer mechanism including timer motor 70 adapted to drive a plurality of switch actuating cams 71, 73, and 75 which are carried on a common shaft 76, through suitable speed reduction gearing (not shown). In the meat aging process to be described, the fresh, cut meat is first treated with the aging accelerator, Thamnidium, and then the meat is placed in the storage zone where the temperature is maintained between approximately 70° F. and 75° F., and at a relative humidity above 90%, for approximately 48 hours. During the last nine hours of the processing period, the meat is exposed to ultraviolet radiation.

Selection of the particular cycle is made by manual actuation of switch 77. With switch 77 in the (open) AGE position, the sterilizing unit S or ultraviolet lamps are placed under the control of switch 79 which is actuated by timer cam 73. To begin the cycle, shaft 76 is rotated in a clockwise direction a sufficient amount to effect a closing of the timer motor switch 81 by cam 75. The circuit is then completed through the timer motor to begin operation thereof and complete a circuit through relay $R_3$ which closes switch 83 in the lamp circuit. At the same time that the timer motor is energized, cam 71 shifts switch arm 85 to the high temperature (72° F.) contact and completes the circuit through the high temperature thermostat 67 so that operation of the reversing switch 60 is exclusively under the control of the high temperature thermostat 67 through conductor 87.

As the timer motor continues rotation, the cam 73 will eventually (about 39 hours) rotate to a position where the follower on switch arm 79a will drop down into the detent 73a and close switch 79 completing the circuit to the sterilizer unit S through closed relay switch 83 and conductor 84. The sterilizer unit remains on for approximately nine hours until completion of the cycle, i.e. about 48 hours, at which time the cams will return to the position illustrated, opening the motor circuit switch 81, switch 83 by de-energization of relay $R_3$, and switch 79. At the same time, the thermostat control switch 85 will shift to the low tempertaure (34° F.) position, opening the circuit through the high temperature thermostat and closing the circuit through the low temperature thermostat. From this point on, the temperature control will be exclusively under low temperature thermostat 65 so that the temperature will cool down to a temperature level suitable for storage and remain there for an indefinite period of time.

It should also be noted that when the processing cycle is initiated by movement of the thermostat selection switch to the high temperature position, a circuit through the humidity control is also completed through conductor 86. The humidity control thus is operative during the entire 48 hour period, but is interrupted when the apparatus is functioning as a cold storage unit.

*Tenderizing*

In one conventional meat tenderizing process, the fresh meat is maintained at a temperature between 70 and 75° F. for approximately 48 hours while the source of ultraviolet radiation is maintained in continuous operation throughout this entire period. At the end of the cycle, the temperature level is dropped to a suitable cold storage level and the ultraviolet radiation discontinued. In general, the control for the tenderizing cycle is much the same as that described above in connection with the aging cycle. However, since the sterilizing unit must be maintained in operation during the entire cycle, the operation of switch 79, which controlled the energization of the ultraviolet lamps in the aging cycle, is rendered ineffective by movement of the selection switch 77 to the TENDERIZE position. This completes a parallel circuit around switch 79 so that the lamps are kept on all during the time that the high temperature thermostat is operative to control the reversing switch. It should be noted that the relay $R_3$ is placed in the circuit to prevent energization of the ultraviolet lamps while the apparatus is operated as a conventional refrigerator. If the selection switch 77 is accidentally left in the TENDERIZE position, with relay $R_3$ in the circuit, the circuit through the lamps cannot be completed unless the timer motor is energized through switch 81.

While this invention has been described in connection with a certain specific embodiment thereof, it is to be understood that this is by way of illustration and not by way of limitation; and the scope of this invention is defined soley by the appended claims which should be construed as broadly as the prior art will permit.

What is claimed is:

1. In apparatus of the character described, the combination comprising an insulated cabinet providing a meat storage zone; a thermoelectric conditioning unit having a load side in thermal communication with said storage zone and a sink side arranged in thermal communication with a heat sink; a sterilization unit; means for supplying unidirectional electrical energy to said thermoelectric conditioning unit, said means including a reversing switch having a first position wherein said electrical energy is supplied so that said thermoelectric conditioning unit pumps heat from said storage zone to said heat sink, a second position wherein said thermoelectric conditioning unit is inoperative, and a third position wherein said electrical energy is supplied so that said thermoelectric conditioning unit pumps heat from said heat sink to said storage zone; a high temperature thermostat; a low temperature thermostat; and control means including a timer programmed to selectively render one or the other of said thermostats operable to control said reversing switch and energize said sterilization unit.

2. Apparatus as defined in claim 1 including a humidification unit operable to maintain the relative humidity in said storage zone above a predetermined value, said humidification unit being energized while said thermoelectric conditioning unit is under the control of said high temperature thermostat.

3. Apparatus as defined in claim 1 including manually operated switch means for selectively controlling the duration of time that said sterilization unit is energized.

4. Apparatus as defined in claim 1 including manually operated switch means for selectively operating said thermoelectric unit as a conventional refrigerator exclusively under the control of said low temperature thermostat.

5. Apparatus as defined in claim 1 including an interlock to prevent energization of said sterilization unit if said timer is de-energized.

6. Apparatus as defined in claim 5 wherein said sterilization unit comprises a source of ultraviolet radiation.

7. In apparatus of the character described the combination comprising an insulated cabinet providing a meat storage zone; a thermoelectric conditioning unit having a load side in thermal communication with said storage zone and a sink side arranged in thermal communication with a heat sink; a source of ultraviolet radiation arranged inside of said cabinet; means for supplying unidirectional electrical energy to said thermoelectric conditioning unit, said means including a reversing switch having a first position wherein said electrical energy is supplied so that said thermoelectric conditioning unit pumps heat from said storage zone to said heat sink, a second position wherein said thermoelectric unit is inoperative, and a third position wherein said electrical energy is supplied so that said thermoelectric conditioning unit pumps heat from said heat sink to said storage zone; a high temperature thermostat; a low temperature thermostat; and control means including a timer, a first, normally closed circuit between said reversing switch and said low temperature thermostat, a second normally open circuit between said reversing switch and said high temperature thermostat, means associated with said timer adapted to open said first circuit and close said second circuit upon initiation of a processing period of predetermined duration, said means returning said first and second circuits to their respective closed and open conditions at the end of said period, whereby said timer is adapted to place said reversing switch under the exclusive control of said high temperature thermostat during said processing period and automatically reintroduce control of said reversing switch by said low temperature thermostat at the end of said processing period.

8. Apparatus as defined in claim 7 including additional means associated with said timer for energizing said radiation source during a portion of said processing period and switch means for selectively placing the energization of said radiation source under the control of said additional means or maintaining said radiation source continuously energized during the entire processing period.

9. Apparatus as defined in claim 7 including a humidification unit adapted to maintain the relative humidity in said storage zone above a predetermined level, said humidification unit being operative only when said reversing switch is under the control of said high temperature thermostat.

References Cited by the Examiner

UNITED STATES PATENTS

| | | | |
|---|---|---|---|
| 2,192,348 | 3/1940 | James | 62—78 |
| 2,384,203 | 9/1945 | Sperti | 62—264 |
| 2,492,308 | 12/1949 | Menges | 62—78 |
| 2,650,882 | 9/1953 | Sperti | 62—78 |
| 2,906,104 | 9/1959 | Schaefer | 62—264 |
| 2,926,089 | 2/1960 | Williams | 99—107 |
| 2,932,573 | 4/1960 | Reiman | 99—107 |
| 2,970,450 | 2/1961 | Roeder | 62—3 |
| 3,174,291 | 3/1965 | Crawford | 62—3 |

WILLIAM J. WYE, *Primary Examiner.*